United States Patent
Lv

(10) Patent No.: US 12,525,862 B2
(45) Date of Patent: Jan. 13, 2026

(54) CURRENT DETECTION CIRCUIT AND CONTROLLER FOR SWITCHING CONVERTER CIRCUIT

(71) Applicant: SHANGHAI BRIGHT POWER SEMICONDUCTOR CO., LTD., Shanghai (CN)

(72) Inventor: Danzhu Lv, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 293 days.

(21) Appl. No.: 18/361,487

(22) Filed: Jul. 28, 2023

(65) Prior Publication Data
US 2024/0039384 A1    Feb. 1, 2024

(30) Foreign Application Priority Data
Jul. 28, 2022 (CN) .......................... 202210894748.5

(51) Int. Cl.
*H02M 3/158* (2006.01)
*H02M 1/00* (2006.01)
*H02M 1/08* (2006.01)

(52) U.S. Cl.
CPC ......... *H02M 1/0009* (2021.05); *H02M 3/158* (2013.01); *H02M 1/08* (2013.01)

(58) Field of Classification Search
CPC ... H02M 1/0009; H02M 3/158; H02M 3/1584
See application file for complete search history.

(56) References Cited

U.S. PATENT DOCUMENTS

| | | | |
|---|---|---|---|
| 10,044,267 B1* | 8/2018 | Childs | H02M 3/156 |
| 2020/0119641 A1* | 4/2020 | Liang | H02M 3/157 |
| 2020/0310475 A1* | 10/2020 | Wang | H02M 1/14 |

FOREIGN PATENT DOCUMENTS

| | | |
|---|---|---|
| CN | 110445353 A | 11/2019 |
| CN | 112803770 A | 5/2021 |
| CN | 113533840 A | 10/2021 |
| DE | 10 2015 101 991 A1 | 8/2015 |
| DE | 10 2017 111 904 A1 | 11/2017 |
| JP | 2000-308331 A | 11/2000 |
| TW | I502873 B | 10/2015 |

* cited by examiner

*Primary Examiner* — Alex Torres-Rivera
(74) *Attorney, Agent, or Firm* — MUNCY, GEISSLER, OLDS & LOWE, P.C.

(57) ABSTRACT

A current detection circuit and a controller for a switching converter circuit are disclosed. An emulated current generation module emulates a current flowing through an inductor, and a current sampling module actually samples the inductor current. Moreover, an error determination module determines an error between the actually sampled and emulated currents and adjusts, based on the error, a rate of variation of the emulated current.

18 Claims, 7 Drawing Sheets

CURRENT DETECTION CIRCUIT AND CONTROLLER FOR SWITCHING CONVERTER CIRCUIT

CROSS-REFERENCE TO RELATED APPLICATION

This application claims the priority of Chinese patent application number 202210894748.5, filed on Jul. 28, 2022, the entire contents of which are incorporated herein by reference.

TECHNICAL FIELD

The present invention relates to the field of current detection technology and, in particular, to a current detection circuit and a controller for a switching converter circuit.

BACKGROUND

Switched-mode power supply (SMPS) converters are widely used in portable electronics and other fields thanks to their high efficiency, low power consumption and other advantages. For SMPS converters, current is an important parameter for loop control, overcurrent protection (including positive overcurrent protection and negative overcurrent protection) and the like. Therefore, almost all SMPS converters require current detection. Referring to FIG. 1, as an example, in an SMPS converter, an input voltage Vin is periodically transmitted to an inductor L and an output capacitor C0 under the turn-on and turn-off actions of an upper power switch HS and a lower power switch LS, and a DC output voltage Vout is obtained across the output capacitor C0. That is, the SMPS converter converts the input voltage Vin into the DC output voltage Vout. The alternate turn-on and turn-off actions of the upper power switch HS and the lower power switch LS determine the increasing or decreasing of a current IL in the inductor L. A current detection module is coupled to a node SW to which all the upper power switch HS, the lower power switch LS and the inductor L are coupled (i.e., an inductor current sampling node) in order to be able to sample the inductor current IL.

However, ringing (oscillations of a voltage at the switching node SW in a frequency band above 200 MHz caused by resonance of the parasitic inductances and parasitic capacitances in the circuit) tends to occur as a consequence of the turn-on and turn-off actions of the upper power switch HS and the lower power switch LS. In order to avoid this, a blanking time may be added (by using a corresponding blanking time signal Blank to finish turn-off of the one of the power switches that has been turned on and turn-on of the other power switch during the blanking time), and the current detection module may detect the current after the blanking time elapses. This, however, may lead to a delay (Blank delay) between the sampled current IL_sense and the actual inductor current IL in the SMPS converter, as shown in FIG. 2. In particular, when a conduction time of the power switch (e.g., the lower power switch LS) to be sampled is a very short period that may be even shorter than the blanking time, the sampled current will have a large error, or even be lost.

Therefore, there is an urgent need for a current detection circuit and a controller for a switching converter circuit, which allow delay-free, accurate detection of an inductor current.

SUMMARY OF THE INVENTION

It is just an object of the present invention to provide a current detection circuit and a controller for a switching converter circuit, which allow delay-free, accurate detection of an inductor current.

To this end, the present invention provides a current detection circuit comprising:
  a current sampling module coupled to an inductor in a switching converter circuit, wherein the current sampling module is configured to sample a current flowing through the inductor to obtain a sampled current;
  an emulated current generation module configured to emulate the current flowing through the inductor to output an emulated current;
  an error determination module coupled to the current sampling module, wherein the error determination module is configured to determine an error between the sampled and emulated currents in each cycle; and
  an error adjustment module coupled to the error determination module and the emulated current generation module, wherein the error adjustment module is configured to adjust, based on the error, a rate of variation of the emulated current output from the emulated current generation module.

Optionally, the error adjustment module may comprise:
  a threshold comparison module coupled to the error determination module, wherein the threshold comparison module is configured to compare the error output from the error determination module with a predetermined threshold; and
  a counter module coupled to the threshold comparison module and the emulated current generation module, wherein the counter module is configured to generate, based on a comparison result output from the threshold comparison module, a corresponding digital signal for adjusting the rate of variation of the emulated current output from the emulated current generation module.

Optionally, the current sampling module may comprise a proportional resistor for sampling the current flowing through the inductor, wherein the emulated current generation module comprises at least one current source, and wherein the error adjustment module adjusts, based on the error between the sampled and emulated currents, transconductance of a corresponding current source so as to enable the adjusted transconductance of the corresponding current source to satisfy the relationship: gm=Ri/L, where gm represents the transconductance of the current source, Ri represents resistance of the proportional resistor, L represents inductance of the inductor.

Optionally, the emulated current generation module may comprise a capacitor and, connected in sequence, a first current source, a control switch and a second current source, wherein the second current source is grounded at first end, the capacitor coupled at a first end to a connection node of the control switch and the second current source, and configured to output the emulated current, the capacitor grounded at a second end, wherein upon the control switch being turned on, the first and second current sources act together to generate a first current for charging the capacitor, and wherein upon the control switch being turned off, the second current source generates a second current for discharging the capacitor.

Optionally, the first current may be proportional to a difference between an input voltage and an output voltage of the switching converter circuit, and the second current may be proportional to the output voltage of the switching converter circuit.

Optionally, the current detection circuit may further comprise a reset module coupled to the emulated current generation module and the current sampling module, wherein the reset module is configured to set the emulated current to be equal to the sampled current before beginning of each cycle.

Optionally, the emulated current generation module may comprise two phase branches, wherein while the emulated current is generated by one of the phase branches, the sampled current is sampled by the other phase branch.

Optionally, each of the phase branches may comprise a capacitor, a phase switch, a sampling switch and, connected in sequence, a first current source, a control switch and a second current source, wherein: the second current source is grounded at a first end; the capacitor is coupled at a first end to a connection node of the control switch and the second current source, with a second end thereof is grounded; the phase switch is coupled at a first end to the connection node, with a second end thereof providing an output terminal of a corresponding phase branch and coupled to an output terminal of the other phase branch to output the emulated current; and the sampling switch is coupled to the connection node at a first end, with a second end thereof to receive the sampled current.

Optionally, the current sampling module may further comprise first to fourth switches, an inverter and a comparator, wherein: the first switch has a drain terminal coupled to the inductor; the first switch has a gate terminal coupled to an output terminal of the inverter; the first switch has a source terminal coupled to a first input terminal of the comparator and a drain terminal of the second switch; the inverter has an input terminal coupled to a gate terminal of the second switch; the comparator has a second input terminal coupled to a source terminal of the third switch and a drain terminal of the fourth switch; the third switch has a drain terminal coupled to a first end of the proportional resistor; the third switch has a gate terminal coupled to an output terminal of the comparator; and the fourth switch has a source terminal that is grounded.

Optionally, the switching converter circuit may comprise at least one power switch coupled to the inductor, wherein the current detection circuit is coupled to a connection node of the inductor and the power switch, and wherein the power switch is controlled by a blanking time signal.

Optionally, at least one of the current sampling module, the emulated current generation module and the error determination module may receive the blanking time signal and be controlled by the blanking time signal.

Optionally, the error determination module may comprise fifth to eighth switches, an integrator and a clamping circuit, wherein: each of the a first end of the fifth switch and a first end of seventh switch is coupled to one phase branch of the emulated current generation module; each of a first end of the sixth switch and a first end of the eighth switch is coupled to the other phase branch of the emulated current generation module; each of a second end of the fifth switch and a second end of the sixth switch is coupled to a positive input terminal of the integrator; each of a second end of the seventh switch and a second end of the eighth switch is coupled to a negative input terminal of the integrator; a first end of the clamping circuit is grounded; and a second end of the clamping circuit is coupled to an output terminal of the integrator and an input terminal of error adjustment module.

Optionally, the threshold comparison module may comprise a first threshold comparator and a second threshold comparator, and wherein: the first threshold comparator has a negative input terminal for receiving a first threshold; the second threshold comparator has a positive input terminal for receiving a second threshold; and each of a positive input terminal of the first threshold comparator and a negative input terminal of the second threshold comparator is coupled to an output terminal of the error determination module.

Based on the same inventive concept, the present invention further provides a controller for a switching converter circuit, which comprises a drive circuit and the current detection circuit as defined above. The drive circuit is coupled to the current detection circuit and is configured to generate a drive signal.

Optionally, the switching converter circuit may comprise a power switch disposed within or externally to the controller, wherein the power switch is coupled to a first end of the inductor, wherein a second end of the inductor is coupled to an output capacitor, and wherein the controller periodically turns on and off the power switch to periodically transmit an input voltage to the inductor and the output capacitor.

Compared with the prior art, the present invention has at least one of the following advantages:

1. The emulated current generation module emulates the inductor current, and the current sampling module actually samples the inductor current. Moreover, the error determination module determines an error between the actually sampled and emulated currents and adjusts, based on the error, a rate of variation of the emulated current, thereby matching the emulated current with the actually sampled inductor current and obtaining an accurate inductor current.

2. There is no delay in the inductor current detected using this approach, and regardless of how short an on-time of any power switch used is, the inductor current can be accurately detected over each cycle. In this way, delay-free, accurate inductor current detection is achievable.

3. With this method, the inductor current can be conveniently and stably acquired over each cycle simply by sampling a current flowing through an upper power switch or a lower power switch in the switching converter circuit, whichever has a longer on-time.

DETAILED DESCRIPTION

Figure 1:
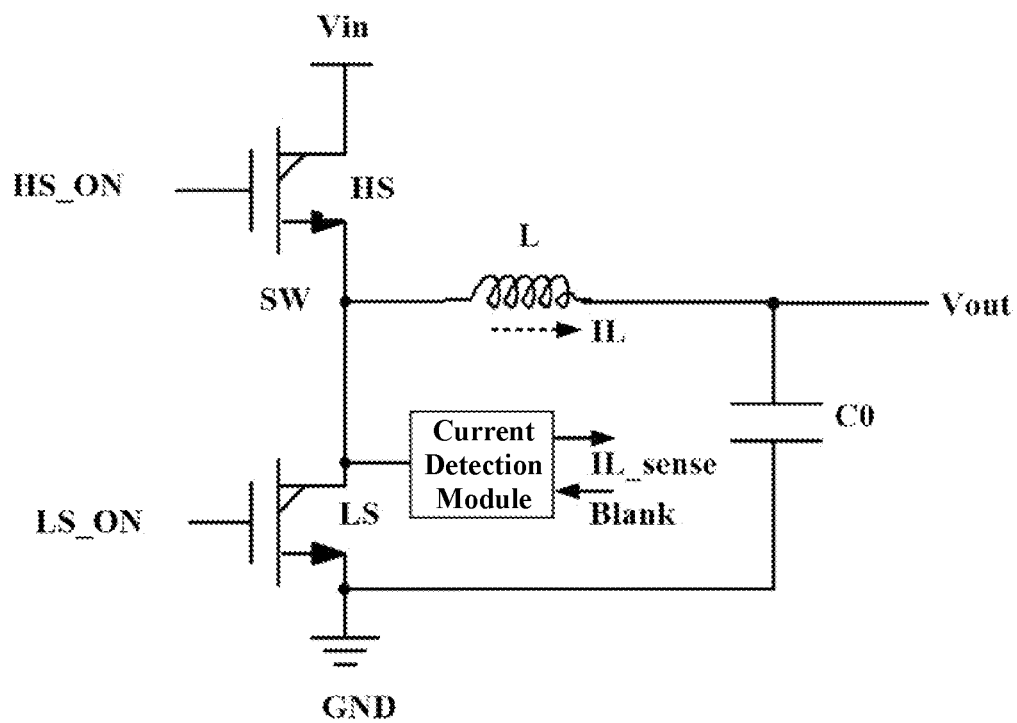
FIG. 1 is a schematic, partial circuit diagram of a conventional buck switching converter circuit.
Figure 2:
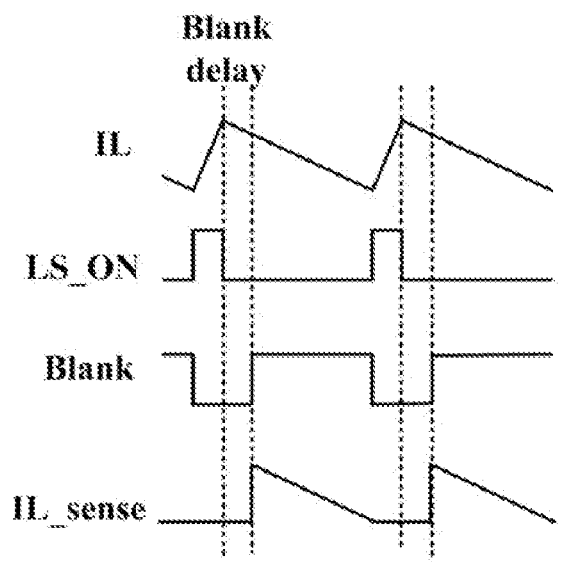
FIG. 2 is a schematic timing diagram of primary signals used in a current detection method for the SMPS converter of FIG. 1.

The following description sets forth numerous specific details in order to provide a more thorough understanding of the present invention. However, it will be apparent to those skilled in the art that the present invention can be practiced without one or more of these specific details. In other instances, well-known technical features have not been described in order to avoid unnecessary obscuring of the invention. It is to be understood that the invention may be embodied in many different forms and should not be construed as being limited to the embodiments set forth below. Rather, these embodiments are provided so that this disclosure is thorough and conveys the scope of the invention to those skilled in the art. In the drawings, like reference numerals refer to like elements throughout. It will be understood that when an element is referred to as being "connected to" or "coupled to" another element, it can be directly connected or coupled to the other element, or intervening elements may also be present. In contrast, when an element is referred to as being "directly connected to" another element, there are no intervening elements. As used herein, the singular forms "a", "an" and "the" are intended to include the plural forms as well, unless the context clearly indicates otherwise. It will be further understood that the term "comprising" specifies the presence of stated features, steps, operations, elements, and/or components, but do not preclude the presence or addition of one or more other features, steps, operations, elements, components, and/or groups thereof. As used herein, the term "and/or" includes any and all combinations of the associated listed items.

The present invention will be described in greater detail below with reference to the accompanying drawings and to specific embodiments. Advantages and features of the invention will become more apparent from the following description. Note that the figures are provided in a very simplified form not necessarily drawn to exact scale and for the only purpose of facilitating easy and clear description of the disclosed embodiments.

Embodiment 1

Figure 3:
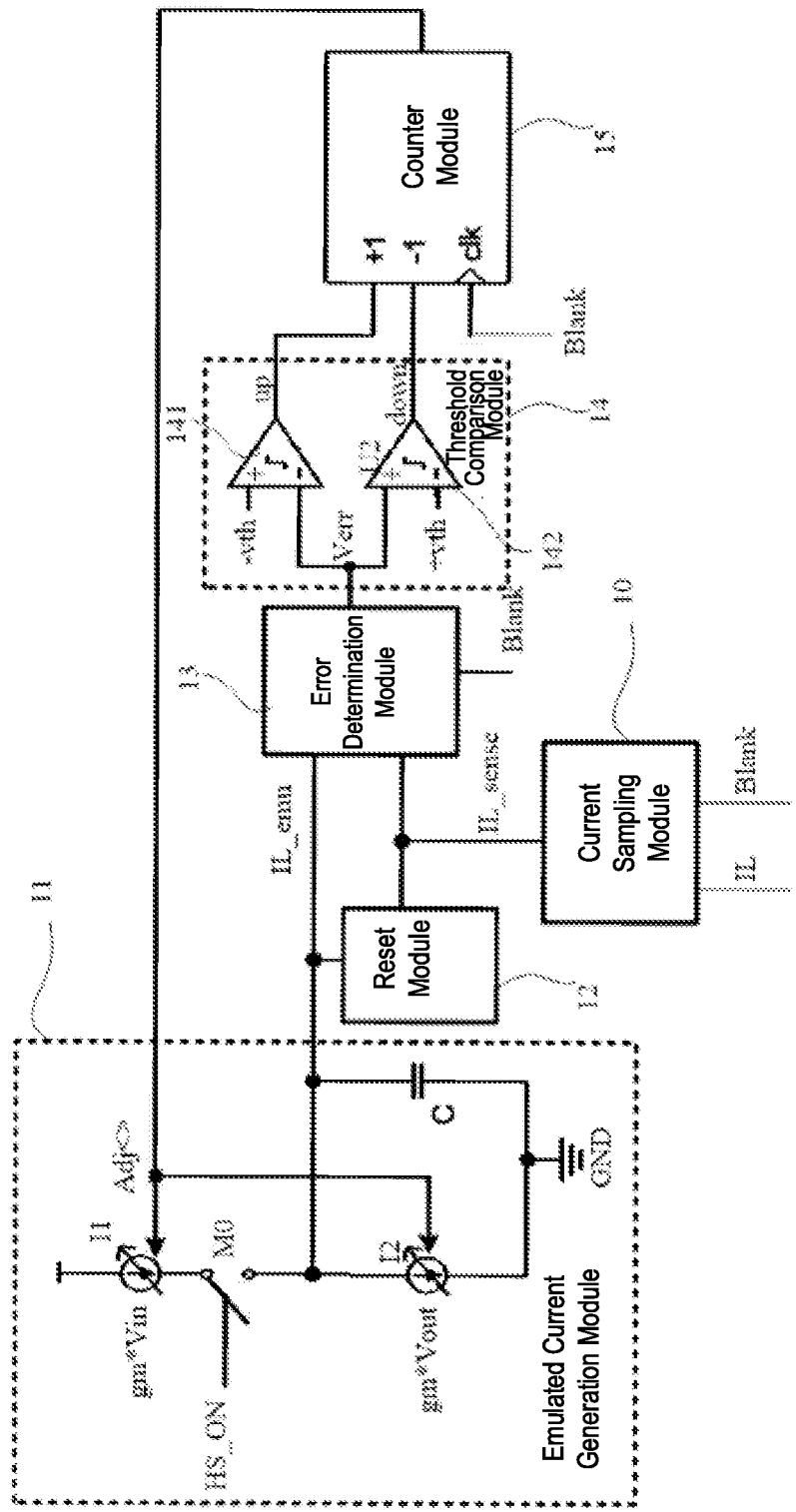
FIG. 3 is a schematic diagram showing the structure of a current detection circuit according to a first embodiment of the present invention.

Referring to FIG. 3, a current detection circuit according to a first embodiment of the present invention includes a current sampling module 10, an emulated current generation module 11, a reset module 12, an error determination module 13 and an error adjustment module. The error adjustment module includes a threshold comparison module 14 and a counter module 15.

Figure 4:
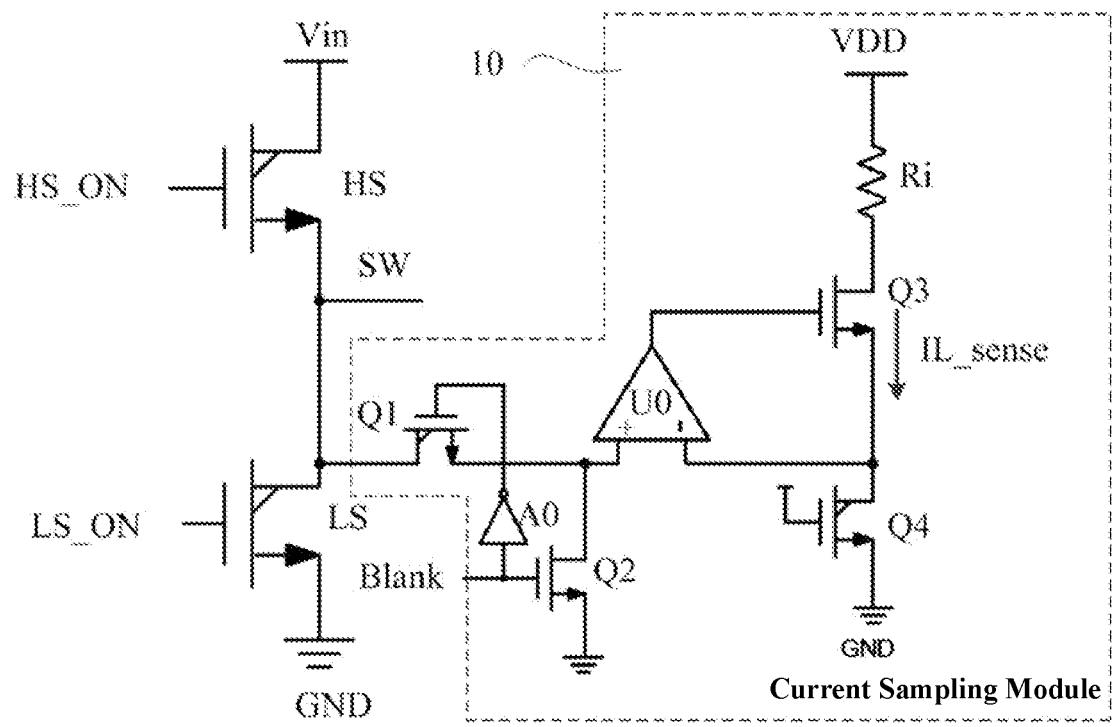
FIG. 4 is a schematic circuit diagram of a current sampling module in the current detection circuit according to the first embodiment of the present invention.

With reference to FIG. 4, the current sampling module 10 is coupled to an inductor in a switching converter circuit, more precisely to a node SW (i.e., an inductor current sampling node) to which an upper power switch HS, a lower power switch LS and the inductor L are all coupled and configured to sample a current IL flowing through the inductor L to obtain a sampled current IL_sense. The current sampling module 10 may be implemented as any suitable current sampling circuit, as described in detail below.

As an example, the current sampling module 10 may include a sampling resistor (not shown) and an operational amplifier (not shown). The sampling resistor is connected in series in a current path of the inductor L, and the operational amplifier is configured to amplify a voltage across the sampling resistor to enable sampling of the current flowing through the inductor L. The operational amplifier in the current sampling module 10 may be integrated into a single controller chip with the emulated current generation module 11, the reset module 12, the error determination module 13, the threshold comparison module 14 and the counter module 15, while the sampling resistor may be disposed externally to the controller chip.

As another example, the current sampling module 10 has a mirror switch (not shown), which makes up a current mirror with a power switch (e.g., HS or LS in FIG. 4) that the current sampling module 10 is coupled to. The current mirror is used to sample the current flowing through the inductor L.

Figure 10:
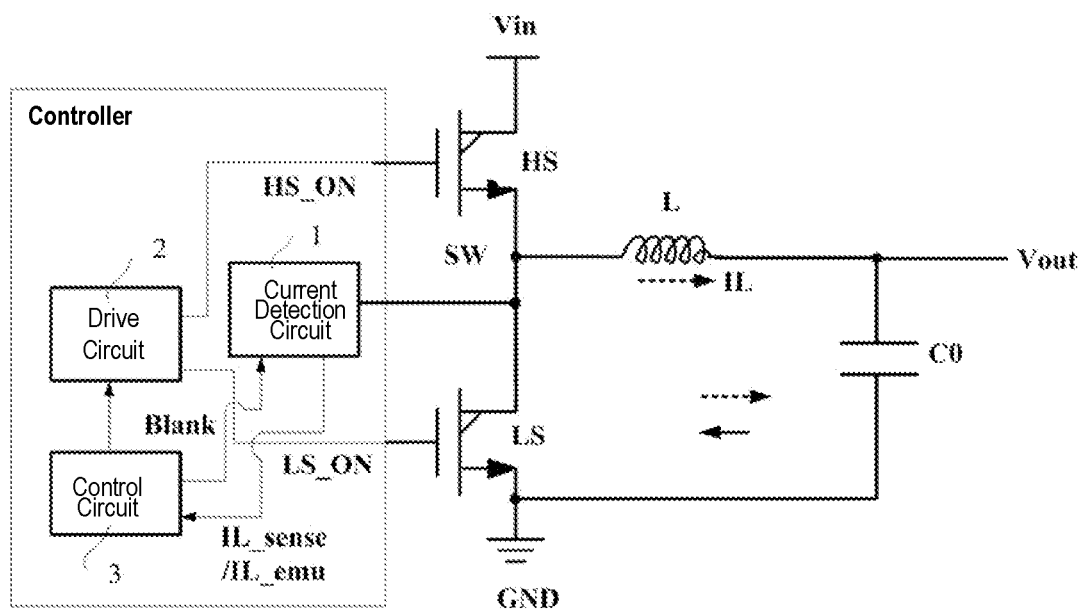
FIG. 10 is a schematic circuit diagram of a controller and a switching converter circuit in which the controller is incorporated according to a third embodiment of the present invention.

As yet another example, referring to FIG. 4, the current sampling module 10 is a current ratio detection circuit including first to fourth switches Q1-Q4, an inverter A0 and a comparator U0. With reference to FIGS. 10 and 4, a drain terminal of the first switch Q1 is coupled to the node SW (i.e., the inductor current sampling node) to which all the upper power switch HS, the lower power switch LS and the inductor L are coupled. A blanking time signal Blank for the lower power switch LS is applied to a gate terminal of the second switch Q2, and an input terminal of the inverter A0 is coupled to a gate terminal of the second switch Q2. A gate terminal of the first switch Q1 is coupled to an output terminal of the inverter A0. The first switch Q1 and the second switch Q2 are controlled in a complementary manner. A source terminal of the first switch Q1 is coupled to a first input terminal "+" of the comparator U0 and a drain terminal of the second switch Q2. A second input terminal "−" of the comparator U0 is coupled to a source terminal of the third switch Q3 and a drain terminal of the fourth switch Q4. A drain terminal of the third switch Q3 is coupled to one end of a proportional resistor Ri, and the other end of the proportional resistor Ri is coupled to an operating voltage VDD. Source terminals of the second switch Q2 and the fourth switch Q4 are both grounded.

An input voltage Vin is transmitted to the inductor L and an output capacitor C0 under the action of periodic turn-on and turn-off actions of the upper power switch HS and the lower power switch LS, and a DC output voltage Vout is obtained across the output capacitor C0. The upper power switch HS and the lower power switch LS are alternately turned on and off under the control of drive signals HS_ON, LS_ON in each cycle (of a system clock) to determine the increasing and decreasing of the current IL in the inductor L. In each cycle, when the drive signal HS_ON is high, the drive signal LS_ON is low, the upper power switch HS is ON, the lower power switch LS is OFF and the node SW is at a high level. When the drive signal LS_ON is high, the drive signal HS_ON is low, the lower power switch LS is ON, the upper power switch HS is OFF and the node SW is low. The current sampling module 10 detects the current flowing through the inductor L at the node SW under the control of the blanking time signal Blank. For example, referring to FIG. 5, when the blanking time signal Blank is at a low level, the current sampling module 10 outputs the sampled current IL_sense that varies with the current IL flowing through the inductor L.

The emulated current generation module 11 is coupled to the reset module 12 and the counter module 15, and is configured to emulate the current flowing through the inductor L to generate and output an emulated current IL_emu.

Optionally, referring to FIG. 3, the emulated current generation module 11 includes at least one current source, and the counter module 15 outputs a digital signal for adjusting transconductance of a corresponding current source in the emulated current generation module 11. As a result, the transconductance of the current source satisfies the following relationship: gm=Ri/L, where gm denotes, the transconductance of the current source; Ri, resistance of the proportional resistor; and L, inductance of the inductor. In this way, a rate of variation of the emulated current IL_emu output from the emulated current generation module 11 can be adjusted.

As an example, referring to FIG. 3, emulated current generation module 11 includes a capacitor C, and connected together in sequence, a first current source I1, a control switch M0 and a second current source I2. One end of the first current source I1 may be coupled to the operating voltage VDD, and one end of the second current ource I2 may be grounded. One end of the capacitor C may be coupled to a connection node of the control switch M0 and the second current source I2, and to output the emulated current IL_emu. The other end of the capacitor C may be grounded, and the drive signal HS_ON may be applied to a control terminal of the control switch M0.

When the upper power switch HS is turned on under the control of the drive signal HS_ON, the control switch M0 is turned on also under the control of the drive signal HS_ON, and the lower power switch LS is turned off under the control of the drive signal LS_ON. As a result, a first current proportional to (Vin-Vout) may be generated and output under the combined action of the first current source I1 and the second current source I2, so as to charge the capacitor C. When the lower power switch LS is turned on under the control of the drive signal LS_ON, the upper power switch HS and the control switch M0 are both turned off under the control of the drive signal LS_ON. As a result, a second current proportional to Vout is generated and output from the second current source I2 to discharge the capacitor C. Since a slope of the inductor current IL is equal to (Vin-Vout)/L at the time when the upper power switch HS is turned on and is equal to −Vout/L at the time when the lower power switch LS is turned on, there is no additional delay of the emulated current IL_emu output from the emulated current generation module 11 with respect to the actual inductor current IL. Moreover, as the transconductance gm (i.e., a ratio of its charge/discharge current to a voltage across its ends) of each of the first current source I1 and the second current source I2 can be adjusted according to an error between the emulated current IL_emu and the actually sampled current IL_sense derived by the error determination module 13, the emulated current IL_emu is able to mimic an actual rate of variation (e.g., slope) of the actual inductor current IL in the inductor L of the switching converter circuit.

Before beginning of each cycle, the reset module 12 configures the actually sampled current IL_sense to be equal to the emulated current IL_emu, ensuring the two signals, i.e., the sampled current IL_sense and the emulated current IL_emu are the same at the beginning of the cycle.

A first input terminal of the error determination module 13 is coupled to an output terminal of the current sampling module 10, and a second input terminal thereof is coupled to an output terminal of the emulated current generation module 11. The error determination module 13 is configured to determine an error between the actually sampled current IL_sense in the inductor L and the emulated current IL_emu in each cycle.

The threshold comparison module 14 is coupled to the error determination module 13 and configured to compare the error output from the error determination module 13 with predetermined thresholds, and to output a comparison result.

As an example, the threshold comparison module 14 includes a second threshold comparator 141 and a first threshold comparator 142. A first threshold +vth is applied to a negative input terminal "−" of the first threshold comparator 142, and a second threshold −vth is applied to a positive input terminal "+" of the second threshold comparator 141. A positive input terminal "+" of the first threshold comparator 142 and a negative input terminal "−" of the second threshold comparator are both coupled to an output terminal of the error determination module 13. The second threshold comparator 141 is configured to compare the error output from the error determination module 13 with the predetermined second threshold −vth, and to output an UP signal according to the comparison result. The first threshold comparator 142 is configured to compare the error output from the error determination module 13 with the predetermined second threshold +vth, and to output a DOWN signal according to the comparison result.

The counter module 15 is a positive-negative counter having: a positive input terminal "+1" coupled to an output terminal of the second threshold comparator 141; a negative input terminal "−1" coupled to an output terminal of the first threshold comparator 142; and a clock terminal clk to which the blanking time signal Blank is applied. As used herein, the term "blanking time signal Blank" may also refer to any other suitable signal related to a control signal for the lower power switch LS (including the drive signal LS_ON), as long as it can effect turn-off of the lower power switch LS. An output terminal of the counter module 15 is coupled to a control terminal of each current source in the emulated current generation module 11. The counter module 15 is configured to generate, based on the comparison result output from the threshold comparison module 14 (i.e., the corresponding UP or DOWN signal), a corresponding digital signal Adj< > for adjusting the rate of variation (e.g., slope) of the emulated current IL_emu output from the emulated current generation module 11. Specifically, adjusting the transconductance gm of each of the first current source I1 and the second current source I2 in the emulated current generation module 11 so as to enable the transconductance to satisfy gm=Ri/L, where Ri denotes resistance of the proportional resistor in the current sampling module 10, and L represents the inductance in the power circuit.

On the basis of the operating principles of the various modules as described above, operation of the current detection circuit according to Embodiment 1 will be explained below.

First of all, before beginning of each cycle, the reset module 12 configures the emulated current IL_emu from the emulated current generation module 11 to be equal to the actually sampled current IL_sense acquired by the current sampling module 10.

Subsequently, as a result of the blanking time signal Blank for the lower power switch LS dropping to a low level, the drive signal LS_ON is at a high level, the drive signal HS_ON is at a low level, the lower power switch LS is ON, the upper power switch HS is OFF and the control switch M0 is OFF. The current sampling module 10 samples the current flowing through the inductor L and acquires the actually sampled current IL_sense. The error determination module 13 determines an error between the actually sampled current IL_sense and the emulate signal IL_emu, and the threshold comparison module 14 compares the error from the error determination module 13 with the predetermined second and first thresholds −vth, +vth. According to the polarity of the UP and DOWN signals output from the threshold comparison module 14, the counter module 15 increments or decrements to generate the corresponding digital signal Adj< >, which adjusts the transconductance gm of the second current source I2 in the emulated current generation module 11 so that the relation gm=Ri/L is satisfied, where Ri represents the resistance of the proportional resistor for current sampling, and L denotes the inductance in the power circuit.

Figure 5:
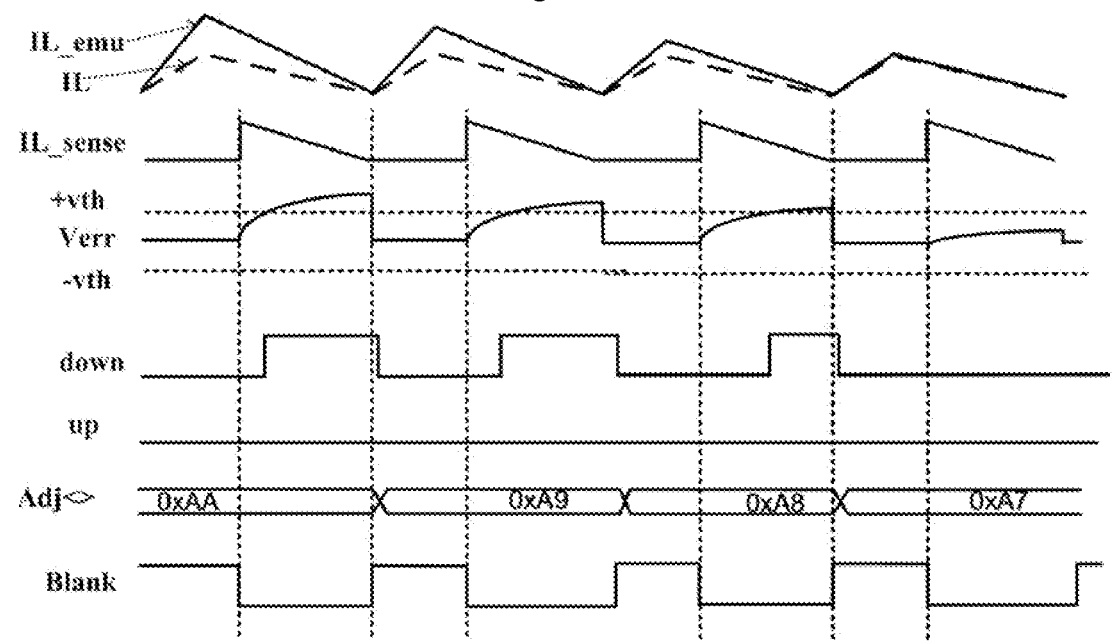
FIG. 5 is a schematic timing diagram illustrating operation of the current detection circuit according to the first embodiment of the present invention.

FIG. 5 shows a timing diagram of the signals involved in the above process. When the slope (absolute value) of the emulated current IL_emu is greater than that of the sampled current IL_sense of the actual inductor current, after the blanking time signal Blank drops to a low level, the error Verr output from the error determination module 13 will exceed the first threshold +vth configured for the threshold comparison module 14. Accordingly, the DOWN signal output from the first threshold comparator 142 is pulled to high level. When the blanking time signal Blank rises to high level, the counter module 14 adjusts the digital signal Adj< > (which may be a binary or hexadecimal digital code) that it outputs to reduce the rate of variation of the emulated current IL_emu output from the emulated current generation module 11, and finally to make the rate of variation of the emulated current IL_emu to be close to that of the sampled current IL_sense of the actual inductor current IL.

It would be appreciated that Embodiment 1 can be applied to inductor-based buck switching converter circuits, boost switching converter circuits and buck-boost switching converter circuits.

For example, in case of a buck switching converter circuit, in general, the drive signal HS_on is at a high level for a very short period of time (i.e., upper power switch HS has a very short on-time), while the drive signal LS_on is at high level for a very long period of time. Accordingly, it is possible to accurately detect the current flowing through the inductor L by current mirroring during the on-time of the lower power switch LS. Therefore, in this way, the inductor current can be stably acquired over each cycle without needing to sample a current flowing through the upper power switch HS.

In view of accuracy degradation of conventional switching converter circuits caused by an inevitable blanking delay occurring during current detection, in the current detection circuit according to Embodiment 1, the capacitor C is charged/discharged to emulate an inductor current, and a rate of variation (i.e., the magnitude of the charge/discharge current for the capacitor C is adjusted by varying the error) of the emulated current IL_emu obtained by emulating the inductor current is adjusted according to a relationship of an error between the sampled current IL_sense obtained by actually sampling the inductor current and the emulated current IL_emu, and the predetermined thresholds. As a result, the emulated current matches the sampled current and thus the accurate inductor current is obtained. With this method, there is no delay in the detected inductor current, and regardless of how short an on-time of any power switch is, the inductor current can be accurately detected over each cycle. Further, with this method, the inductor current can be stably acquired over each cycle simply by sampling a current flowing through the upper or lower power switch in the switching converter circuit, whichever has a longer on-time.

Embodiment 2

Figure 6:
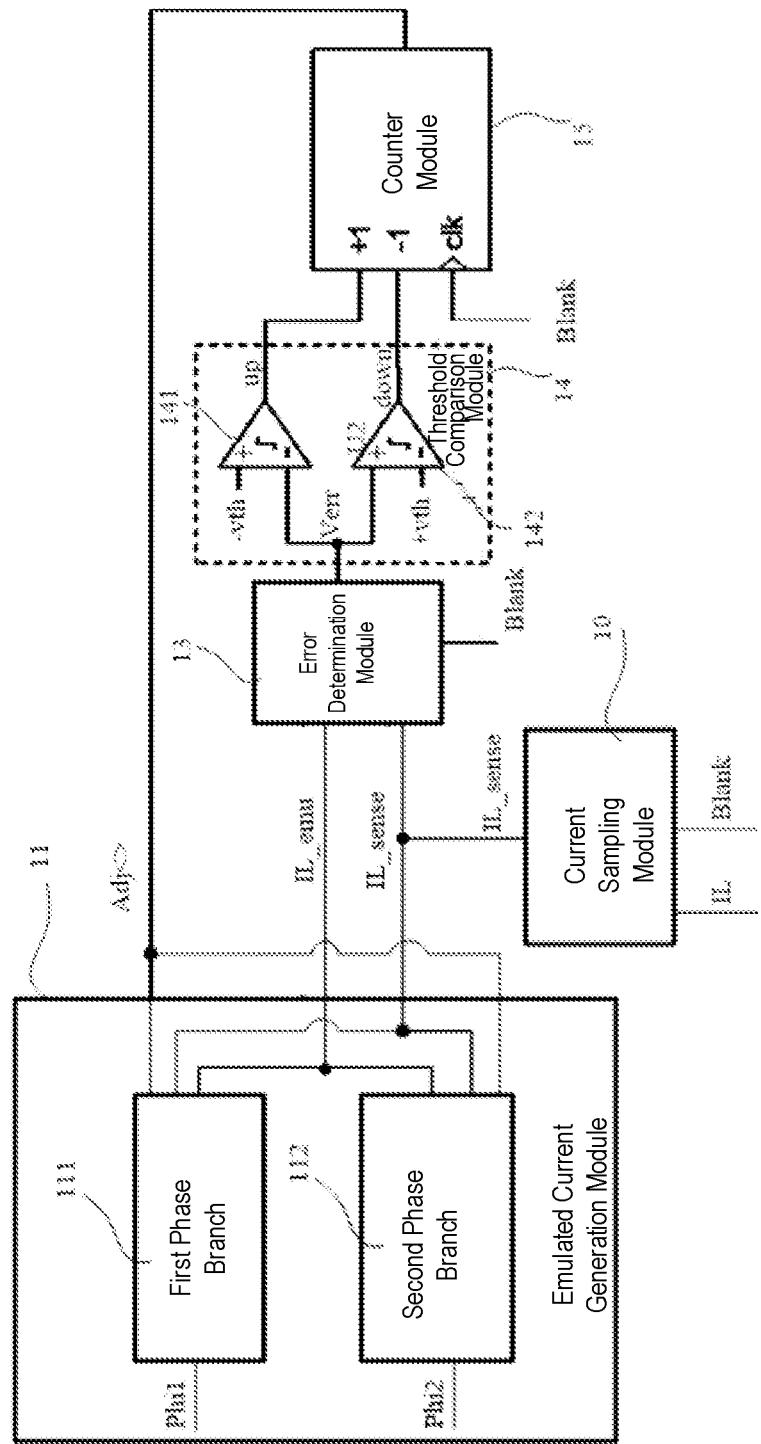
FIG. 6 is a schematic diagram showing the structure of a current detection circuit according to a second embodiment of the present invention.

Referring to FIG. 6, in a second embodiment, there is provided a current detection circuit, which differs from that of the first embodiment essentially in omitting the reset module and modifying the emulated current generation module 11 into a module operating in an alternate two-phase input/output manner to enable resetting of the emulated current IL_emu by using the sampled current IL_sense output from the current sampling module 10. While the emulated current IL_emu is generated by one phase branch of the emulated current generation module 11, the current IL_sense is sampled by the other phase branch.

Specifically, the emulated current generation module 11 includes two phase branches: a first phase branch 111 and a second phase branch 112. While the emulated current IL_emu is generated by one phase branch, the current IL_sense is sampled by the other phase branch.

Figure 7:
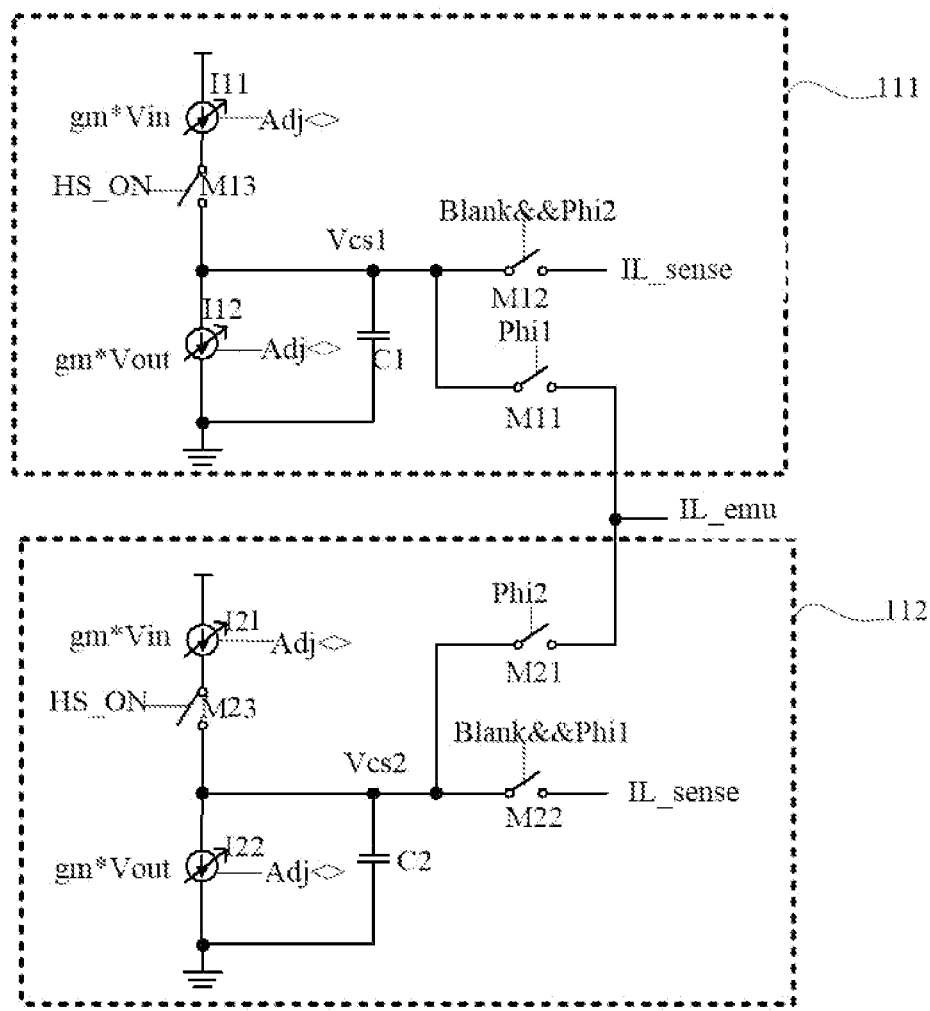
FIG. 7 is a schematic circuit diagram of an emulated current generation module in the current detection circuit according to the second embodiment of the present invention.

As an example, referring to FIG. 7, the first phase branch 111 includes a capacitor C1, a phase switch M11, a sampling switch M12 and, coupled in sequence, a first current source I11, a control switch M13 and a second current source I12. One end of the second current source I12 is grounded. One end of the capacitor C1, one end of the phase switch M11 and one end of the sampling switch M12 are all coupled to a connection node of the control switch M13 and the second current source I12, and the connection node is configured to provide a sampled voltage signal Vcs1. The other end of the capacitor C1 is grounded. The other end of the phase switch M11 provides an output terminal of the first phase branch 111, which is coupled to an output terminal of the second phase branch 112 and configured to output the emulated current IL_emu. The other end of the sampling switch M12 is configured to output the sampled current IL_sense.

The second phase branch 112 includes a capacitor C2, a phase switch M21, a sampling switch M22 and, connected in sequence, a first current source I21, a control switch M23 and a second current source I22. One end of the second current source I21 is grounded. One end of the capacitor C2, one end of the phase switch M21 and one end of the sampling switch M22 are all coupled to a connection node of the control switch M23 and the second current source I22, and the connection node is configured to provide a sampled voltage signal Vcs2. The other end of the capacitor C2 is grounded. The other end of the phase switch M21 provides an output terminal of the second phase branch 111, which is coupled to an output terminal of the first phase branch 111 and configured to output the emulated current IL_emu. The other end of the sampling switch M22 is configured to output the sampled current IL_sense.

Both the first current sources I11 and I21 may be coupled at one end to the operating voltage VDD, and the control terminals of the first current sources I11 and I21 and the second current sources I12 and I22 may be also coupled to the output terminal of the counter module 15 in order to receive the digital signal Adj< >. In this way, transconductance adjustment of all the first current sources I11 and I21 and the second current sources I12 and I22 are controlled of the digital signal Adj< > output from the counter module 15. A first phase signal Phi1 is applied to a control terminal of the phase switch M11, and a second phase signal Phi2 is applied to a control terminal of the phase switch M21. A first sampling control signal Blank&&Phi2 is applied to a control terminal of the sampling switch M12. The first sampling control signal Blank&&Phi2 results from a logical AND operation performed on the blanking time signal Blank and the second phase signal Phi2. A second sampling control signal Blank&&Phi1 is applied to a control terminal of the sampling switch M22. The second sampling control signal Blank&&Phi1 results from a logical AND operation performed on the blanking time signal Blank and the first phase signal Phi1. The first phase signal Phi1 and the second phase signal Phi2 are inverted in phase with respect to each other.

Figure 8:
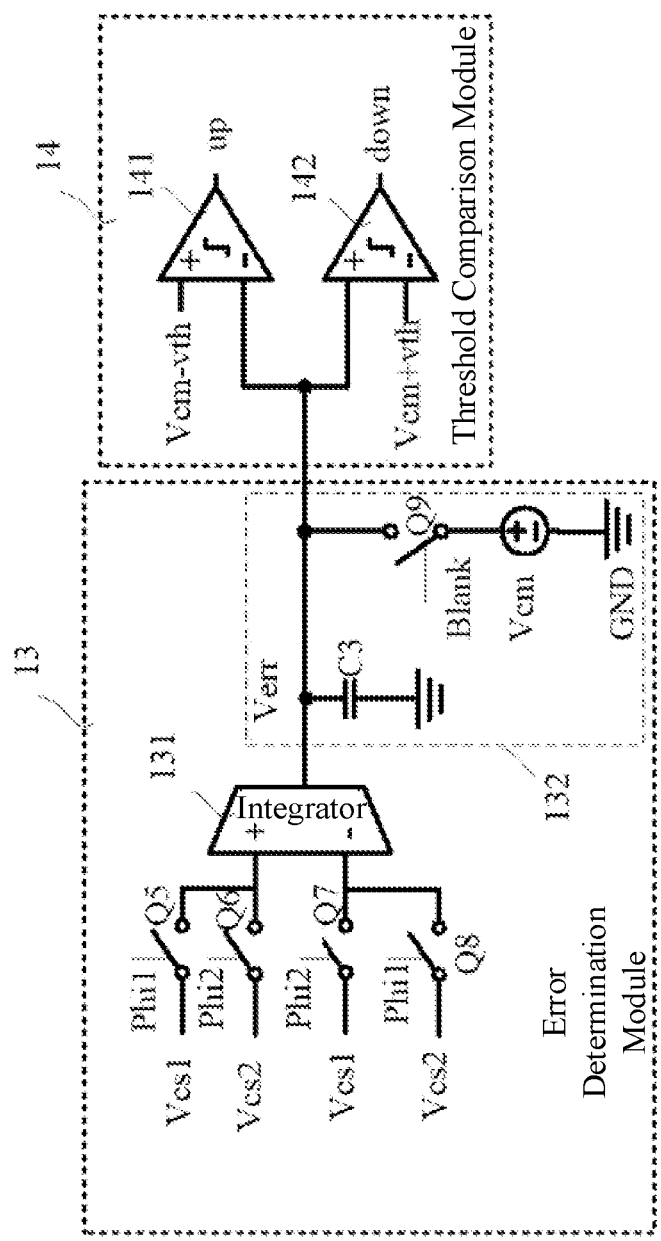
FIG. 8 is a schematic circuit diagram of an error determination module in the current detection circuit according to the second embodiment of the present invention.
Figure 9:
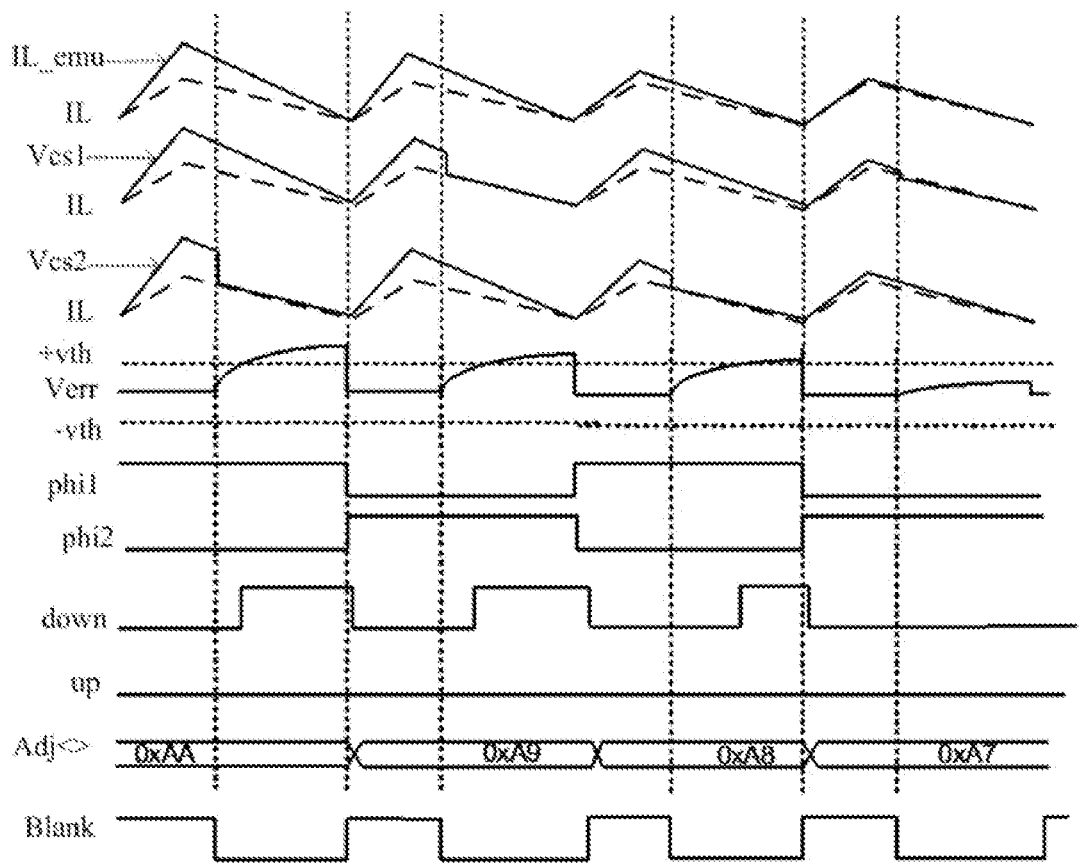
FIG. 9 is a schematic timing diagram illustrating operation of the current detection circuit according to the second embodiment of the present invention.

Further, as an example, with reference to FIGS. 7 and 8, the error determination module 13 includes fifth to eighth switches Q5-Q8, an integrator 131 and a clamping circuit 132. One end of the fifth switch Q5 and one end of the seventh switch Q7 are both coupled to the first phase branch 111 of the emulated current generation module 11 in order to receive the sampled voltage signal Vcs1. One end of the sixth switch Q6 and one end of the eighth switch Q8 are both coupled to the second phase branch 112 of the emulated current generation module 11 in order to receive the sampled voltage signal Vcs2. The other end of the fifth switch Q5 and the other end of the sixth switch Q6 are both coupled to a positive input terminal "+" of the integrator 131, and the other end of the seventh switch Q7 and the other end of the eighth switch Q8 are both coupled to a negative input terminal "−" of the integrator 131. The first phase signal Phi1 is applied to both a control terminal of the fifth switch Q5 and a control terminal of the eighth switch Q8, and a second phase signal Phi2 is applied to both a control terminal of the sixth switch Q6 and a control terminal of the seventh switch Q7. The clamping circuit 12 includes a capacitor C3, a clamping switch Q9 and a voltage source Vcm. One end of the capacitor C3 and a negative terminal of the voltage source Vcm are both grounded. The other end of the capacitor C3 and one end of the clamping switch Q9 are both coupled to an output terminal of the integrator 131, the positive input terminal of the first threshold comparator 142 and the negative input terminal of the second threshold comparator 141 in the threshold comparison module 14. The other end of the clamping switch Q9 is coupled to a positive terminal of the voltage source Vcm, and the blanking time signal Blank is applied to a control terminal of the clamping switch Q9.

Operation of the current detection circuit according to Embodiment 2 is described below with reference to FIGS. 6 to 9.

For the two-phase sampling voltage signals Vcs1 and Vcs2, when phi1=1, Vcs1 serves as the emulated current IL_emu, and Vcs2 is output as the sampled current IL_sense. In this case, the emulated current IL_emu (sampled voltage signal Vcs1) is applied to the positive terminal of the integrator 131, and the sampled current IL_sense (sampled voltage signal Vcs2) is applied to the negative terminal of the integrator 131. Before the current detection carried out by the lower power switch LS, an error output from the error determination module 13 is clamped to Vcm by the clamping circuit 132. After the blanking time for current detection of the lower power switch LS elapses, Q9 is turned off, and the error Verr (which has varied from Vcm) is output from the error determination module 13. The threshold comparison module 14 determines whether Verr exceeds (Vcm+vth) or is below (Vcm−vth), so as to determine whether it is necessary to decrease (DOWN=1) or increase (UP=1) the emulated current IL_emu (i.e., change its rate of variation) to bring the emulated current IL_emu closer to the actually sampled current IL_sense.

When phi2=1, the sampled voltage signal Vcs2 serves as the emulated current IL_emu, and the sampled voltage signal Vcs1 is output as the sampled current IL_sense. In this case, the sampled voltage signal Vcs2 is applied to the positive terminal of the integrator 131, and the sampled voltage signal Vcs1 is applied to the negative terminal of the integrator 131. Subsequently, the rate of variation of the emulated current IL_emu can be adjusted in a similar manner as described above to bring the emulated current IL_emu closer to the actually sampled current IL_sense.

As can be seen from the above, through feeding the two-phase signals Vcs1 and Vcs2 generated by the emulated current generation module 11 to the error determination module 13, error signals can be produced in successive cycles.

According to Embodiment 2, likewise, the capacitors C1, C2 are charged and discharged to emulate variation of the external inductor current, and the magnitude of the charge/discharge currents for the capacitors C1, C2 is adjusted according to an error derived from a comparison made between the emulated current and the actually sampled current, thereby achieving delay-free, accurate detection of the inductor current.

Embodiment 3

Referring to FIG. 10, in a third embodiment, there is provided a controller for a switching converter circuit, which includes a control circuit 3, a drive circuit 2 and a current detection circuit 1 as defined above.

The drive circuit 2 is coupled to the current detection circuit and a gate terminal of at least one power switch in the switching converter circuit. For example, it may be coupled to gate terminals of an upper power switch HS and a lower power switch LS. The drive circuit 2 is configured to generate drive signals for turning on and off the power switches that it is coupled to.

The power switches may be disposed within or externally to the controller. The power switches are coupled to one end of an inductor in the switching converter circuit, and the other end of the inductor is coupled to an output capacitor. The controller periodically turns on and off the power switches to periodically transmit an input voltage to the inductor and the output capacitor.

The current detection circuit 1 may be implemented as any one of the current detection circuits as described in the above embodiments, with its input terminal being coupled to a connection node of the inductor L and the power switches (e.g., the upper power switch HS and the lower power switch LS in FIG. 10).

An input terminal of the control circuit 3 is coupled to a corresponding output terminal of the current detection circuit 1 in order to allow it to receive a current signal from the current detection circuit 1, which may be either an emulated current IL_emu, or an actually sampled current IL_sense. A corresponding output terminal of the control circuit 3 is coupled to a control terminal of the drive circuit 2 to allow it to provide the drive circuit 2 with a corresponding control signal (e.g., a pulse width modulation (PWM) signal) according to the current signal from the current detection circuit 1. Another corresponding output terminal of the control circuit 3 is coupled to the current detection circuit 1 to allow it to provide the current detection circuit 1 with at least one of various signals including a blanking time signal Blank, a first phase signal Phi1, a second phase signal Phi2, a first sampling control signal Blank&&Phi2 and a second sampling control signal Blank&&Phi1.

Based on the same inventive concept, in Embodiment 3, there is also provided a switching converter circuit including an upper power switch HS, a lower power switch LS, an inductor L, an output capacitor C0 and the controller as defined above. The upper power switch HS and the lower power switch LS may be disposed either within or externally to the controller. A source terminal of the upper power switch HS and a drain terminal of the lower power switch LS are both coupled to one end of the inductor L and one end of a current detection circuit 1 in the controller at a node SW. The other end of the inductor L is coupled to one end of the output capacitor C0, and the other end of the output capacitor C0 is grounded. A gate terminal of the upper power switch HS and a gate terminal of the lower power switch LS are both coupled to an output terminal of a drive circuit 2 in the controller, and an input voltage Vin is applied to a source terminal of the upper power switch HS. A source terminal of the lower power switch LS is grounded.

The controller periodically turns on and off the upper power switch HS and the lower power switch LS to periodically transmit the input voltage Vin to the inductor L and the output capacitor C0, and a DC output voltage Vout is obtained across the output capacitor C0.

In summary, according to the present invention, the emulated current generation module emulates a current flowing through the inductor, and the current sampling module actually samples the inductor current. Moreover, the error determination module determines an error between the actually sampled current and the emulated current and produces, based on magnitude of the error and predetermined thresholds, a corresponding digital signal for adjusting a rate of variation (e.g., slope) of the emulated current. As a result, the emulated current matches the actual inductor current and the accurate inductor current is obtained. Further, there is no delay in the inductor current detected using this method, and regardless of how short an on-time of any power switch used is, the inductor current can be accurately detected over each cycle. That is, the method allows delay-free, accurate inductor current detection. Furthermore, with this method, the inductor current can be conveniently and stably acquired over each cycle simply by sampling a current flowing through an upper power switch or a lower power switch in an SMPS converter, whichever has a longer on-time.

In addition, it would be appreciated that although each of the above embodiments has been described in the context of a buck switching converter circuit including both an upper power switch HS and a lower power switch LS as an example, the present invention is not so limited, as it may also be applicable to boost and buck-boost switching converter circuits including only one power switch. Of course, the circuit designs of the various modules in the current detection circuits according to the present invention are not limited to those exemplified above, and any suitable circuit designs can be employed, as long as the functions of the modules can be achieved.

For example, in an alternative embodiment of the present invention, resetting of the sampled current IL_sense to the emulated current IL_emu may be accomplished by shorting the sampled current IL_sense to the emulated current IL_emu before beginning of each cycle. However, this will take up part of the on-time of the lower power switch LS.

As another example, in another alternative embodiment of the present invention, the error determination module may adjust the rate of variation (e.g., slope) of the emulated current IL_emu through an error obtained by comparing it with a rate of variation of the sampled current IL_sense or by comparing their corresponding DC currents. However, this requires more sophisticated logic compared to the foregoing first and second embodiments due to more variables being involved.

The description presented above is merely that of some preferred embodiments of the present invention and does not limit the scope thereof in any sense. Any and all changes and modifications made by those of ordinary skill in the art based on the above teachings are intended to fall within the scope of the present invention.

What is claimed is:

1. A current detection circuit, comprising:
a current sampling module, coupled to an inductor in a switching converter circuit, wherein the current sampling module is configured to sample a current flowing through the inductor to obtain a sampled current;
an emulated current generation module, configured to emulate the current flowing through the inductor to output an emulated current;
an error determination module coupled to the current sampling module, wherein the error determination module is configured to determine an error between the sampled current and the emulated current in each cycle; and
an error adjustment module coupled to the error determination module and the emulated current generation module, wherein the error adjustment module is configured to adjust, based on the error, a rate of variation of the emulated current output from the emulated current generation module,
wherein the error adjustment module comprises:
a threshold comparison module coupled to the error determination module, wherein the threshold comparison module is configured to compare the error output from the error determination module with a predetermined threshold; and
a counter module coupled to the threshold comparison module and the emulated current generation module, wherein the counter module is configured to generate, based on a comparison result output from the threshold comparison module, a corresponding digital signal for adjusting the rate of variation of the emulated current output from the emulated current generation module.

2. The current detection circuit of claim 1, wherein the current sampling module comprises a proportional resistor for sampling the current flowing through the inductor, wherein the emulated current generation module comprises at least one current source, and wherein the error adjustment module adjusts, based on the error between the sampled current and the emulated current, a transconductance of a corresponding current source so as to enable the adjusted transconductance of the corresponding current source to satisfy a relationship: gm=Ri/L, where gm represents the transconductance of the current source, Ri represents a resistance of the proportional resistor, L is an inductance of the inductor.

3. The current detection circuit of claim 2, wherein the current sampling module further comprises a first switch to a fourth switch, an inverter and a comparator, wherein: the first switch has a drain terminal coupled to the inductor; the first switch has a gate terminal coupled to an output terminal of the inverter; the first switch has a source terminal coupled to a first input terminal of the comparator and a drain terminal of the second switch; the inverter has an input terminal coupled to a gate terminal of the second switch; the comparator has a second input terminal coupled to a source terminal of the third switch and a drain terminal of the fourth switch; the third switch has a drain terminal coupled to a first end of the proportional resistor; the third switch has a gate terminal coupled to an output terminal of the comparator; and the fourth switch has a source terminal that is grounded.

4. The current detection circuit of claim 1, wherein the emulated current generation module comprises a first current source, a control switch and a second current source connected in sequence, and a capacitor, wherein the second current source is grounded at a first end, wherein the capacitor is coupled at a first end to a connection node of the control switch and the second current source, and is configured to output the emulated current, wherein the capacitor is grounded at a second end, wherein upon the control switch being turned on, the first current source and the second current source act together to generate a first current for charging the capacitor, and wherein upon the control switch being turned off, the second current source generates a second current for discharging the capacitor.

5. The current detection circuit of claim 4, wherein the first current is proportional to a difference between an input voltage and an output voltage of the switching converter circuit, and wherein the second current is proportional to the output voltage of the switching converter circuit.

6. The current detection circuit of claim 1, further comprising a reset module coupled to the emulated current generation module and the current sampling module, wherein the reset module is configured to set the emulated current to be equal to the sampled current before beginning of each cycle.

7. The current detection circuit of claim 1, wherein the emulated current generation module comprises two phase branches, and wherein while the emulated current is generated by one of the two phase branches, the sampled current is sampled by the other phase branch.

8. The current detection circuit of claim 7, wherein each of the two phase branches comprises: a first current source, a control switch and a second current source connected in sequence, a capacitor, a phase switch and a sampling switch, wherein: the second current source is grounded at a first end; the capacitor is coupled at a first end to a connection node of the control switch and the second current source, with a second end thereof is grounded; the phase switch is coupled at a first end to the connection node, with a second end thereof providing an output terminal of a corresponding phase branch and coupled to an output terminal of the other phase branch to output the emulated current; and the sampling switch is coupled to the connection node at a first end, with a second end thereof to receive the sampled current.

9. The current detection circuit of claim 8, wherein the error determination module comprises a fifth switch to an eighth switch, an integrator and a clamping circuit, wherein: each of the a first end of the fifth switch and a first end of seventh switch is coupled to one phase branch of the emulated current generation module; each of a first end of the sixth switch and a first end of the eighth switch is coupled to the other phase branch of the emulated current generation module; each of a second end of the fifth switch and a second end of the sixth switch is coupled to a positive input terminal of the integrator; each of a second end of the seventh switch and a second end of the eighth switch is coupled to a negative input terminal of the integrator; a first end of the clamping circuit is grounded; and a second end of the clamping circuit is coupled to an output terminal of the integrator and an input terminal of error adjustment module.

10. The current detection circuit of claim 1, wherein the switching converter circuit comprises at least one power switch coupled to the inductor, wherein the current detection circuit is coupled to a connection node of the inductor and the power switch, and wherein the power switch is controlled by a blanking time signal.

11. The current detection circuit of claim 10, wherein at least one of the current sampling module, the emulated current generation module and the error determination module receives the blanking time signal and is controlled by the blanking time signal.

12. The current detection circuit of claim 1, wherein the threshold comparison module comprises a first threshold comparator and a second threshold comparator, and wherein: the first threshold comparator has a negative input terminal for receiving a first threshold; the second threshold comparator has a positive input terminal for receiving a second threshold; and each of a positive input terminal of the first threshold comparator and a negative input terminal of the second threshold comparator is coupled to an output terminal of the error determination module.

13. A controller for a switching converter circuit, wherein the controller comprises a drive circuit and a current detection circuit, wherein the current detection circuit comprises:
a current sampling module, coupled to an inductor in the switching converter circuit, wherein the current sampling module is configured to sample a current flowing through the inductor to obtain a sampled current;
an emulated current generation module, configured to emulate the current flowing through the inductor to output an emulated current;
an error determination module coupled to the current sampling module, wherein the error determination module is configured to determine an error between the sampled current and the emulated current in each cycle; and
an error adjustment module coupled to the error determination module and the emulated current generation module, wherein the error adjustment module is configured to adjust, based on the error, a rate of variation of the emulated current output from the emulated current generation module, and
wherein the drive circuit is coupled to the current detection circuit and is configured to generate a drive signal, wherein the error adjustment module comprises:
a threshold comparison module coupled to the error determination module, wherein the threshold comparison module is configured to compare the error output from the error determination module with a predetermined threshold; and
a counter module coupled to the threshold comparison module and the emulated current generation module, wherein the counter module is configured to generate, based on a comparison result output from the threshold comparison module, a corresponding digital signal for adjusting the rate of variation of the emulated current output from the emulated current generation module.

14. The controller of claim 13, wherein the switching converter circuit comprises a power switch disposed within or externally to the controller, wherein the power switch is coupled to a first end of the inductor, wherein a second end of the inductor is coupled to an output capacitor, and wherein the controller periodically turns on and off the power switch to periodically transmit an input voltage to the inductor and the output capacitor.

15. The controller of claim 13, wherein the emulated current generation module comprises a first current source, a control switch and a second current source connected in sequence, and a capacitor, wherein the second current source is grounded at a first end, wherein the capacitor is coupled at a first end to a connection node of the control switch and the second current source, and is configured to output the emulated current, wherein the capacitor is grounded at a second end, wherein upon the control switch being turned on, the first current source and the second current source act together to generate a first current for charging the capacitor, and wherein upon the control switch being turned off, the second current source generates a second current for discharging the capacitor.

16. The controller of claim 15, wherein the first current is proportional to a difference between an input voltage and an output voltage of the switching converter circuit, and wherein the second current is proportional to the output voltage of the switching converter circuit.

17. The controller of claim 13, further comprising a reset module coupled to the emulated current generation module and the current sampling module, wherein the reset module is configured to set the emulated current to be equal to the sampled current before beginning of each cycle.

18. The controller of claim 13, wherein the emulated current generation module comprises two phase branches, and wherein while the emulated current is generated by one of the two phase branches, the sampled current is sampled by the other phase branch.

* * * * *